United States Patent
Horvitz et al.

(10) Patent No.: US 7,613,670 B2
(45) Date of Patent: *Nov. 3, 2009

(54) PRECOMPUTATION OF CONTEXT-SENSITIVE POLICIES FOR AUTOMATED INQUIRY AND ACTION UNDER UNCERTAINTY

(75) Inventors: Eric J. Horvitz, Kirkland, WA (US);
Paul B. Koch, Seattle, WA (US);
Raman K. Sarin, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/969,053

(22) Filed: Jan. 3, 2008

(65) Prior Publication Data
US 2008/0162394 A1    Jul. 3, 2008

Related U.S. Application Data

(63) Continuation of application No. 11/172,016, filed on Jun. 29, 2005, now Pat. No. 7,428,521.

(51) Int. Cl.
G06F 17/00 (2006.01)
G06N 5/02 (2006.01)

(52) U.S. Cl. ....................................... 706/46
(58) Field of Classification Search .................. 706/46
See application file for complete search history.

(56) References Cited

U.S. PATENT DOCUMENTS

| | | | |
|---|---|---|---|
| 5,493,692 A | 2/1996 | Theimer et al. | |
| 5,544,321 A | 8/1996 | Theimer et al. | |
| 5,555,376 A | 9/1996 | Theimer et al. | |
| 5,603,054 A | 2/1997 | Theimer et al. | |
| 5,611,050 A | 3/1997 | Theimer et al. | |

(Continued)

FOREIGN PATENT DOCUMENTS

WO    WO 9800787    1/1998

OTHER PUBLICATIONS

Formally comparing user and implementer model-based testing methods Andres, C.; Llana, L.; Rodriguez, I.; Software Testing Verification and Validation Workshop, 2008. ICSTW '08. IEEE International Conference on Apr. 9-11, 2008 pp. 1-10 Digital Object Identifier 10.1109/ICSTW.2008.18.*

(Continued)

*Primary Examiner*—Michael B Holmes
(74) *Attorney, Agent, or Firm*—Wolf, Greenfield & Sacks, P.C.

(57) ABSTRACT

Learning, inference, and decision making with probabilistic user models, including considerations of preferences about outcomes under uncertainty, may be infeasible on portable devices. The subject invention provides systems and methods for pre-computing and storing policies based on offline preference assessment, learning, and reasoning about ideal actions and interactions, given a consideration of uncertainties, preferences, and/or future states of the world. Actions include ideal real-time inquiries about a state, using pre-computed value-of-information analyses. In one specific example, such pre-computation can be applied to automatically generate and distribute call-handling policies for cell phones. The methods can employ learning of Bayesian network user models for predicting whether users will attend meetings on their calendar and the cost of being interrupted by incoming calls should a meeting be attended.

20 Claims, 11 Drawing Sheets

U.S. PATENT DOCUMENTS

| | | | |
|---|---|---|---|
| 5,812,865 | A | 9/1998 | Theimer et al. |
| 6,067,565 | A * | 5/2000 | Horvitz ...................... 709/218 |
| 6,085,226 | A * | 7/2000 | Horvitz ...................... 709/203 |
| 6,182,133 | B1 * | 1/2001 | Horvitz ...................... 709/223 |
| 6,466,232 | B1 | 10/2002 | Newell et al. |
| 6,513,046 | B1 | 1/2003 | Abbott, III et al. |
| 6,549,915 | B2 | 4/2003 | Abbott, III et al. |
| 6,747,675 | B1 | 6/2004 | Abbott et al. |
| 6,791,580 | B1 | 9/2004 | Abbott et al. |
| 6,801,223 | B1 | 10/2004 | Abbott et al. |
| 6,812,937 | B1 | 11/2004 | Abbott et al. |
| 6,842,877 | B2 | 1/2005 | Robarts et al. |
| 6,952,732 | B2 * | 10/2005 | Nourbakhsh et al. ........ 709/226 |
| 7,233,933 | B2 * | 6/2007 | Horvitz et al. ................ 706/21 |
| 7,283,883 | B2 * | 10/2007 | Voit et al. ...................... 700/97 |
| 7,428,521 | B2 * | 9/2008 | Horvitz et al. ................ 706/52 |
| 2001/0040590 | A1 | 11/2001 | Abbott et al. |
| 2001/0040591 | A1 | 11/2001 | Abbott et al. |
| 2001/0043231 | A1 | 11/2001 | Abbott et al. |
| 2001/0043232 | A1 | 11/2001 | Abbott et al. |
| 2002/0032689 | A1 | 3/2002 | Abbott, III et al. |
| 2002/0044152 | A1 | 4/2002 | Abbott, III et al. |
| 2002/0052930 | A1 | 5/2002 | Abbott et al. |
| 2002/0052963 | A1 | 5/2002 | Abbott et al. |
| 2002/0054130 | A1 | 5/2002 | Abbott, III et al. |
| 2002/0054174 | A1 | 5/2002 | Abbott et al. |
| 2002/0078204 | A1 | 6/2002 | Newell et al. |
| 2002/0080155 | A1 | 6/2002 | Abbott et al. |
| 2002/0080156 | A1 | 6/2002 | Abbott et al. |
| 2002/0083025 | A1 | 6/2002 | Robarts et al. |
| 2002/0083158 | A1 | 6/2002 | Abbott et al. |
| 2002/0087525 | A1 | 7/2002 | Abbott et al. |
| 2002/0099817 | A1 | 7/2002 | Abbott et al. |
| 2003/0046401 | A1 | 3/2003 | Abbott et al. |
| 2003/0154476 | A1 | 8/2003 | Abbott, III et al. |
| 2005/0034078 | A1 | 2/2005 | Abbott et al. |

OTHER PUBLICATIONS

An XML-based architecture for adaptive Web hypermedia systems using a probabilistic user model Cannataro, M.; Pugliese, A.; Database Engineering and Applications Symposium, 2000 International Sep. 18-20, 2000 pp. 257-265 Digital Object Identifier 10.1109/Ideas.2000.880585.*

Andy Harter, et al., a Distributed Location System for the Active Office, IEEE Network, 1994, pp. 62-70.

Guanling Chen, et al., A Survey of Context-Aware Mobile Computing Research, Dartmouth Computer Science Technical Report, 2000, 16 pages.

William Noah Schilt, A System Architecture for Context-Aware Mobile Computing, Columbia University, 1995, 153 pages.

Mike Spreitzer, et al., Providing Location Information in a Ubiquitous Computing Environment, SIGOPS '93, 1993, pp. 270-283.

Marvin Theimer, et al., Operating System Issues for PDAs, In Fourth Workshop on Workstation Operating Systems, 1993, 7 pages.

Roy Want, Active Badges and Personal Interactive Computing Objects, IEEE Transactions on Consumer Electronics, 1992, 11 pages, vol. 38— No. 1.

Bill N. Schilit, et al., The ParcTab Mobile Computing System, IEEE WWOS-IV, 1993, 4 pages.

Bill Schilit, et al., Context-Aware Computing Applications, In Proceedings of the Workshop on Mobile Computing Systems and Applications, Dec. 1994. pp. 85-90.

Bill N. Schilit, et al., Customizing Mobile Applications, Proceedings USENIX Symposium on Mobile and Location Independent Computing, Aug. 1993, 9 pages.

Mike Spreitzer, et al., Architectural Considerations for Scalable, Secure, Mobile Computing with Location Information, In The 14th International Conference on Distributed Computing Systems, Jun. 1994, pp. 29-38.

Mike Spreitzer et al., Scalable, Secure, Mobile Computing with Location Information, Communications of the ACM, Jul. 1993, 1 page, Vol. 36—No. 7.

Roy Want, et al., The Active Badge Location System, ACM Transactions on Information Systems, Jan. 1992, pp. 91-102, vol. 10—No. 1.

Mark Weiser, Some Computer Science Issues in Ubiquitous Computing, Communications of the ACM, Jul. 1993, pp. 75-84, vol. 36—No. 7.

M. Billinghurst, et al., An Evaluation of Wearable Information Spaces, Proceedings of the Virtual Reality Annual International Symposium, 1998, 8 pags.

Bradley J. Rhodes, Remembrance Agent: A continuously running automated information retrieval system, The Proceedings of The First International Conference on The Practical Application Of Intelligent Agents and Multi Agent Technology, 1996, pp. 487-495.

Eric Horvitz, et al., In Pursuit of Effective Handsfree Decision Support: Coupling Bayesian Inference, Speech Understanding, and User Models, 1995, 8 pages.

Bradley J. Rhodes, The Wearable Remembrance Agent: A System for Augmented Theory, The Proceedings of The First International Symposium on Wearable Computers, Oct. 1997, pp. 123-128.

Eric Horvitz, et al., Attention-Sensitive Alerting in Computing Systems, Microsoft Research, Aug. 1999.

Bill N. Schilit, et al., Disseminationg Active Map Information to Mobile Hosts, IEEE Network, 1994, pp. 22-32, vol. 8—No. 5.

Mark Billinghurst, et al., Wearable Devices: New Ways to Manage Information, IEEE Computer Society, Jan. 1999, pp. 57-64.

Thad Eugene Starner, Wearable Computing and Contextual Awareness, Massachusetts Institute of Technology, Jun. 1999, 248 pages.

Bradley J. Rhodes, The Wearable Remembrance Agent: A System for Augmented Memory, Personal Technologies Journal Special Issue on Wearable Computing, 1997, 12 pages.

Workshop on Wearable Computing Systems, Aug. 19-21, 1996.

Mark Billinghurst, Research Directions in Wearable Computing, University of Washington, May 1998, 48 pages.

Mark Weiser, The Computer for the 21st Century, Scientific American, Sep. 1991, 8 pages.

T. Joachims, Text categorization with support vector machines: learning with many relevant features, Machine Learning, European Conference on Machine Learning, Apr. 21, 1998, pp. 137-142.

International Search Report dated Sep. 29, 2003 for PCT Application Serial No. 00/20685, 3 Pages.

Robert M. Losee, Jr., Minimizing information overload: the ranking of electronic messages, Journal of Information Science 15, Elsevier Science Publishers B.V., 1989, pp. 179-189.

Chickering D. M, Heckerman D. , Meek C. , A Bayesian approach to learning Bayesian networks with local structure. 1997, pp. 80-89, In Proc. of UAI 1997.

Fogarty J., Hudson S. E, Lai J., Examining the Robustness of Sensor-Based Statistical Models of Human Interruptability, 2004, Proc. of CHI 2004.

Horvitz E., Koch P., Kadie C. M. , Jacobs A., Coordinate: Probabilistic Forecasting of Presence and Availability. 2002, pp. 224-233, Proc. of UAI 2002.

Horvitz E., Apacible J., Learning and Reasoning about Interruption , 2003, pp. 20-27, Proc. of ICMI 2003.

Horvitz E. , Apacible J. , Koch P. , BusyBody: Creating and Fielding Personalized Models of the Cost of Interruption, 2004, Prc. of CSCW 2004.

Jameson A. Numerical Uncertainty Management in User and Student Modeling: An Overview of Systems and Issues. User Modeling and User-Adapted Interaction, vol. 5, 1996, pp. 193-251.

Jameson A. , Adaptive Interfaces and Agents in J. Jacko and A. Sears, Human-computer interaction handbook, 2003, pp. 305-330, Erlbaum Publishers.

Mynatt B., Tullio J., Inferring Calendar Event Attendance, 2001, Proc. of Intelligent User Interfaces, pp. 121-128, ACM Press.

* cited by examiner

| DATE | Subject | Cost | | |
|---|---|---|---|---|
| Oct. 8, 2004 | 10/8/2004 Computatational History in A | ○ High | ● Medium | ○ Low |
| Oct. 8, 2004 | 10/8/2004 Structural Comparsion in E | ○ High | ● Medium | ○ Low |
| Oct. 7, 2004 | Attila's going away party, 630 cafeter | ○ High | ● Medium | ○ Low |
| Oct. 7, 2004 | LJW CSE Colloquium – 10/7/04 "The | ○ High | ● Medium | ○ Low |
| Oct. 7, 2004 | 10/7/2004 The totally nonnegative part | ○ High | ● Medium | ○ Low |
| Oct. 7, 2004 | Updated: Adaptive Systems & Interacti | ○ High | ● Medium | ○ Low |
| Oct. 7, 2004 | 10/7/2004 Dota Mining & Machine Le | ● High | ○ Medium | ○ Low |
| Oct. 7, 2004 | LJW CSE Televised Talks for October | ○ High | ● Medium | ○ Low |
| Oct. 6, 2004 | 10/6/2004 Toolkit for Construction and | ○ High | ● Medium | ○ Low |
| Oct. 6, 2004 | 10/6/2004 Some uses of orthogonal pc | ○ High | ● Medium | ○ Low |
| Oct. 6, 2004 | 10/6/2004 Command Post of the Futur | ○ High | ● Medium | ○ Low |
| Oct. 6, 2004 | ASI dev group mid-week meeting | ● High | ○ Medium | ○ Low |
| Oct. 6, 2004 | 10/6/2004 SHARK – A Pen Gesture | ○ High | ● Medium | ○ Low |
| Oct. 6, 2004 | 10/6/2004 1. Vision Extraordinary Con | ○ High | ● Medium | ○ Low |
| Oct. 6, 2004 | ASI dev group mid-week meeting | ● High | ○ Medium | ○ Low |
| Oct. 6, 2004 | UW CSE Colloquium – 10/5/04 - Res | ○ High | ● Medium | ○ Low |

300

Cost of Interruption for meetings contexts

| | |
|---|---|
| High meeting cost | 7 |
| Medium meeting cost | 5 |
| Low meeting cost | 0.9 |

FIG. 3

PRECOMPUTATION OF CONTEXT-SENSITIVE POLICIES FOR AUTOMATED INQUIRY AND ACTION UNDER UNCERTAINTY

CROSS-REFERENCE TO RELATED APPLICATIONS

This application is a continuation of U.S. patent application Ser. No. 11/172,016, filed Jun. 29, 2005, and entitled PRECOMPUTATION OF CONTEXT-SENSITIVE POLICIES FOR AUTOMATED INQUIRY AND ACTION UNDER UNCERTAINTY, the entirety of which is incorporated herein by reference.

BACKGROUND OF THE INVENTION

Over the last decade, there has been increasing interest shown toward technologies relating to the use of probabilistic user modeling for inferring user goals and states of the world under uncertainty. The user models have been applied typically in desktop settings, where designers can assume that a personal computer—often having extensive processing capabilities, is available for performing inferences. The forms that a user model can manifest are often as varied as the purposes for which such models are formed. For instance, to cite but a few cases, these models may seek to describe the cognitive processes that underlie the user's actions; the differences between the user's skills and expert skills; the user's behavioral patterns or preferences; or the user's characteristics.

Early applications of machine learning in user modeling often focused on the first two of the above noted model types, with particular emphasis given to developing models of cognitive processes. In contrast, recent efforts may have been more focused on users' behavioral patterns, rather than on the cognitive processes that underlie that behavior. Applications of machine learning to discovering users' characteristics have been limited in many cases due to the complexity of the models. For example, very substantial increases in purchases are claimed for systems that recommend products to users of retail web sites using models based on purchases by other users. In other cases, situations in which the user repeatedly performs a task that involves selecting among several predetermined options appear ideal for using standard machine learning techniques to form a model of the user. One example of such a task is processing e-mail by deleting some messages and filing others into folders. Another example is to determine which news articles to read from a webpage. In such situations, the information available to the user to describe the problem and the decision made can serve as the training data for a learning algorithm. The algorithm creates a model of a user's decision making process that can then be used to emulate the user's decisions on future problems. Initially, one may consider such user modeling problems as straightforward standard classification learning tasks. However, user modeling presents a number of very significant challenges for machine learning applications. Notably, how to apply learning obtained by such models on devices that may not posses the capabilities to operate the models in real time.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The subject invention relates to systems and methods that pre-compute or predetermine probabilistic models in an offline, high-processing environment in order to generate portable decision-making policies that can be distributed to various devices. Such policies can be cached or stored on remote or mobile devices having limited processing resources and employed to enhance the decision-making capabilities of the devices. In one aspect, various models are defined and trained over time such as in a desktop computer setting. These models can learn from implicit or explicit user inputs/actions and context over time to help guide model decision outcomes. After the learning phase, policies or rules are automatically generated from the models that are tailored to control decision capabilities of a remote or mobile device. The policies can be encoded in a file and transported to a mobile device to guide or control operations of the device and to ultimately enhance the capabilities of the device. In this manner, rather that compute complex models on devices having more limited capabilities, predetermined control policies that are automatically derived from more complex offline models can be executed efficiently in real time while mitigating processing requirements of the devices. Thus, by distributing intelligence in this manner, various applications such as communications, control environments, remote computing, and so forth can be supported on smaller, lower cost, and portable devices.

To the accomplishment of the foregoing and related ends, certain illustrative aspects of the invention are described herein in connection with the following description and the annexed drawings. These aspects are indicative of various ways in which the invention may be practiced, all of which are intended to be covered by the subject invention. Other advantages and novel features of the invention may become apparent from the following detailed description of the invention when considered in conjunction with the drawings.

BRIEF DESCRIPTION OF THE DRAWINGS

FIG. 3 illustrates an example tool for accessing costs in accordance with an aspect of the subject invention.

DETAILED DESCRIPTION OF THE INVENTION

Figure 1:
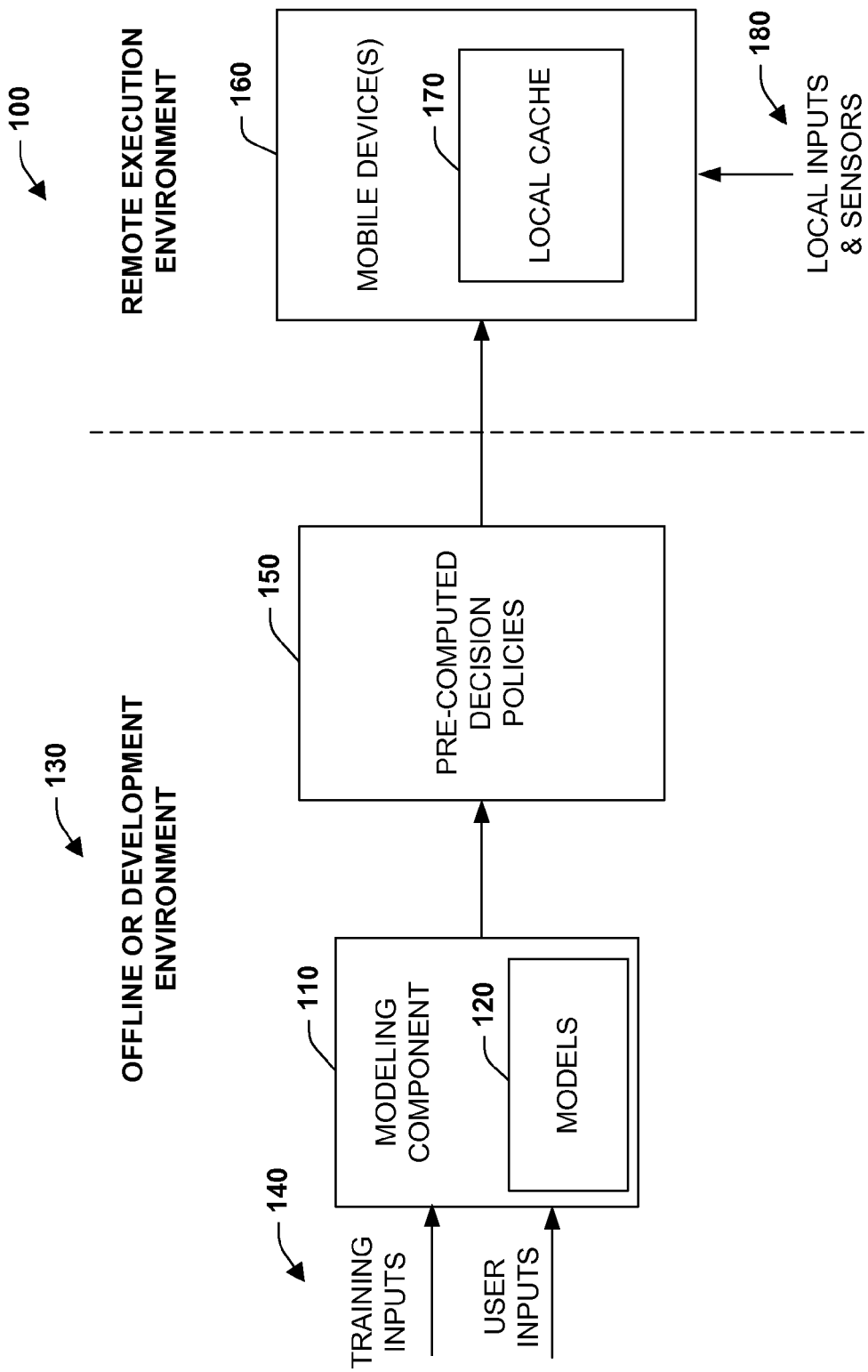
FIG. 1 is a schematic block diagram illustrating a distributed model processing system in accordance with an aspect of the subject invention.

The subject invention relates to systems and methods that employ pre-computed decision-making instructions in mobile or remote devices to enhance the capabilities of devices having limited resources to process more complex models. In one aspect, a policy component is provided that includes decision-making instructions that are derived from probabilistic user models developed in an offline computing environment. A mobile device caches or stores the decision-making instructions to facilitate functional operations on the device. This type of distribution of model intelligence can support a plurality of applications ranging from communications to remote control situations requiring decision capabilities with limited processing or memory resources. For instance, this includes the pre-computation of optimum or ideal policies from probabilistic user models and storing output from the models on a cell phone for decision-making in a mobile setting. Such pre-computation and caching of policies enables probabilistic learning and reasoning to be applied to a large and growing number of small devices and appliances in an environment with limited computational abilities.

As used in this application, the terms "component," "system," "object," "model," "policy," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Furthermore, inference can be based upon logical models or rules, whereby relationships between components or data are determined by an analysis of the data and drawing conclusions therefrom. For instance, by observing that one user interacts with a subset of other users over a network, it may be determined or inferred that this subset of users belongs to a desired social network of interest for the one user as opposed to a plurality of other users who are never or rarely interacted with.

Referring initially to FIG. 1, a distributed model processing system 100 is illustrated in accordance with an aspect of the subject invention. The system 100 includes a modeling component 110 having one or more probabilistic or learning models 120 that are trained over time from user activities. This model learning or training generally takes place in an offline environment 130 such as is in a desktop or workstation computing environment adapted to operate the modeling component 110 and thus to define and generate the models 120. The models 120 can be trained from various inputs 140 over time for a plurality of user situations such as learning how to mange time, communications, appointments, and so forth. The inputs 140 can include explicit user inputs (e.g., configuration selections, question/answer) such as from mouse selections, keyboard selections, speech, calendars, schedulers, and so forth. Also, the inputs 140 can include training from implied activities such as how users respond to communications, interact with applications, and how they respond to various system events.

After the models have been developed, configured or trained, a policy component 150 is generated by the modeling component 110 such that various policies, rules or other decision capabilities are encoded within a file or storage medium (e.g., XML file), wherein such policies are generated to provide control or interface responses for various user situations. For example, the models 120 can be trained to manage a user's appointments and communications based upon past user activities. The policies 150 are thus derived from modeled responses to these past activities and employed to predict and control future situations. In one example, the models 120 may be trained to guide communications to users based in part on who the communications are from. One policy may be that communications from immediate family members are immediately routed to the user whereas another policy may be that communications from unknown persons within an organization are routed to voice mail. The policy component 150 can be downloaded to one or more mobile devices 160 and executed from a local cache 170 or storage medium. Thus, in lieu of executing the models 120 directly, the mobile devices 160 execute dedicated policies 150 that are generated or derived from the models. The policies provide streamlined logic capabilities or rules that can be executed in constrained processing situations to guide future events and thus mitigate processing requirements of the mobile devices 160.

As illustrated, the mobile devices 160 can employ a plurality of inputs or sensors 180 to control execution of the policies stored in the cache 170. These inputs 180 can include microphones, photocells, cameras, accelerometers, thermometers, barometers, GPS devices, wireless radio signals, such as 802.11 or GSM strengths, keypad inputs, pressure sensors, and so forth. Such local sensors can be used and their availability or conditional availability ("sensors may be available" but cannot assumed to be definitely available) can be considered in the development of logical and expected-value policies. Such sensors can be embedded in the device or be connected to a device via a wired connection, or via a wireless connection such as the Bluetooth device association standard. Policies can consider states of one or more sensors or statistical summaries of the states or dynamics of states over time. For example, a GPS or GSM-based location system can allow a device to know if a user is driving, and furthermore is in a smooth driving highway situation versus stop and go traffic. Such distinctions can be associated with different costs of interruptions, considered in cached policies.

Beyond relying on an expected cost or value analysis, components or applications can admit, integrate, or overlay sets of logical rules or defaults with policies derived from expected value considerations. In some cases, users may specify logical policies that override other policies based on direct assessments of cost or preference. For example, a user may desire to assert that no calls will be taken if they are sensed as being in stop and go traffic. This can be overlaid as an override on more detailed expected-value-centric policies.

Before proceeding to describe various example models, policies, and systems in more detail, it is to be appreciated that the system 100 can be applied to substantially any type application where the models 120 are developed on one system 110, automatically converted to policies 150, and executed locally in real time on a subsequent mobile or remote device 160. In one specific example of these concepts, probabilistic models can guide the handling of telephone calls by cell phones, so as to deliberate about the cost of interruption versus the cost of deferral of an incoming call. Such local decisions can be made at cell phones or mobile computing devices, based on a consideration of the user's context and multiple properties of meetings, for example.

Local decision making can be based on sensed properties of meetings on a user's calendar and on properties of callers based on caller identification, however methods described herein can be extended to local sensing at 180 in suitably outfitted devices 160. As will be described in more detail below, learning of predictive models of attendance and of interruptability are described. This includes the computation of an expected cost of interruption from the output of these models. Also, other aspects include pre-computing dialog policies such as the computation of the value of information to reason about the value of acquiring additional information from users in real time. This includes how to pre-compute and cache policies on cell phones, for example, that consider whether calls/messages should interrupt users presently or be delayed until some time in the future.

Figure 2:
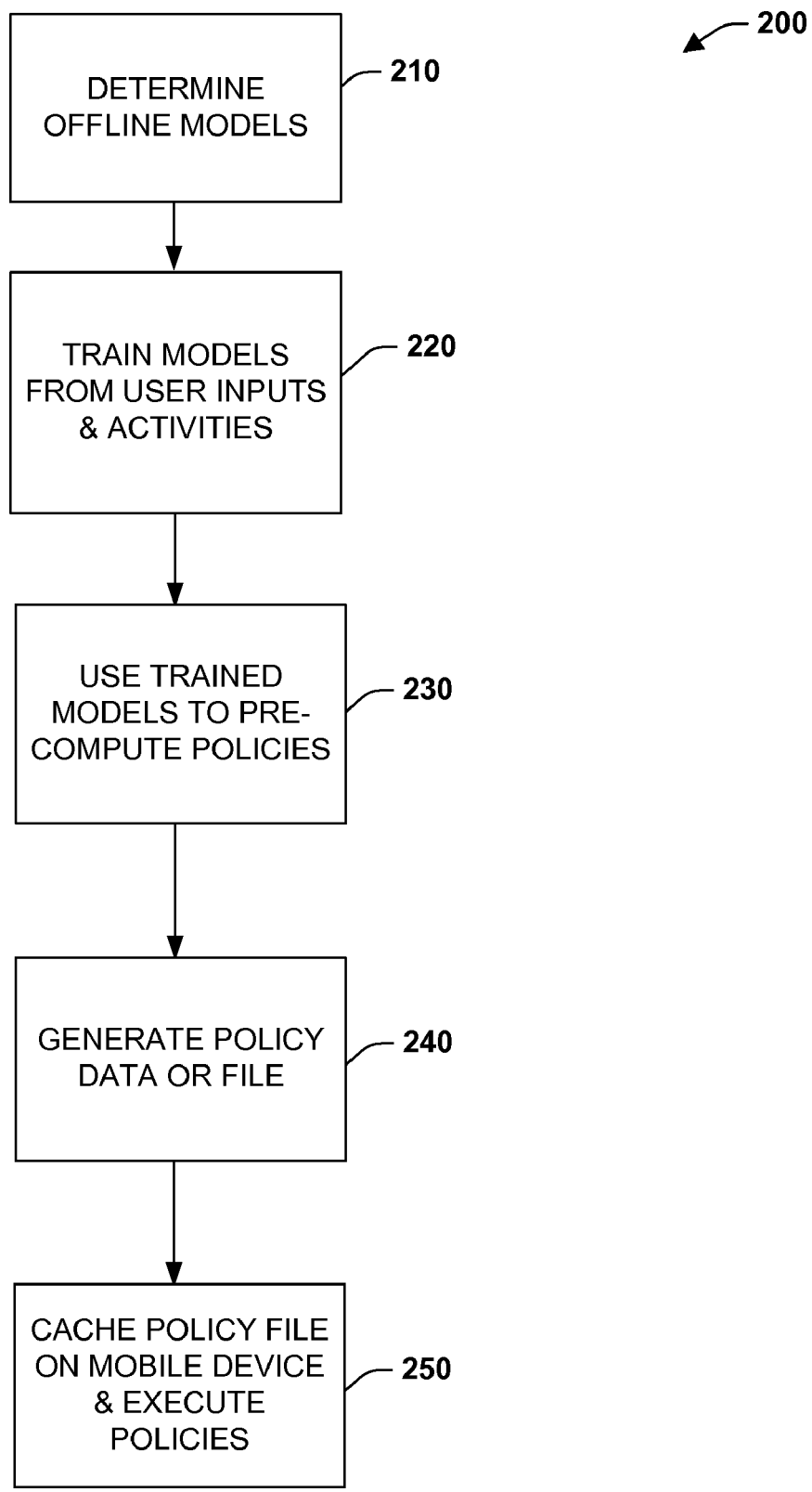
FIG. 2 is a flow diagram illustrating distributed model and policy processing in accordance with an aspect of the subject invention.

Referring now to FIG. 2, example distributed model and policy processing aspects 200 are illustrated in accordance with an aspect of the subject invention. While, for purposes of simplicity of explanation, the methodologies are shown and described as a series or number of acts, it is to be understood and appreciated that the subject invention is not limited by the order of acts, as some acts may, in accordance with the subject invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the subject invention.

Before proceeding, it is noted that FIG. 2 illustrates a generalized process 200 for defining/training models offline, generating polices from the models, and executing the policies locally on remote or mobile devices. Following this discussion, a detailed application example relating to FIG. 2 is provided and described in FIGS. 3-8 that relates to controlling communications at a local device such as a cell phone. It is to be appreciated, however, that the subject invention is not limited to the specific examples shown and can be applied to substantially any application that employs the generalized principles described in FIG. 2.

Proceeding to 210 of FIG. 2, one or more user models are defined and developed offline from an executing application such as in a desktop computing environment. Such models can include probabilistic models, learning models such as Bayesian networks or classifiers, Hidden Markov models, statistical models, and so forth. At 220, the models are trained over time for specific applications such as communications routing, message processing, automated scheduling, remote control situations, and so forth. Such training can occur from a plurality of sources such as from monitored user activities, explicit or implicit user input or feedback and so forth. At 230, output from the trained models is employed to pre-compute or predetermine one or more policies that guide future decision making processes based upon past learning experiences of the models (e.g., based upon past learning from user's calendar, user shows high probability to attend meeting if certain individuals are invited (or other parameter), thus generate policy that provides a meeting reminder when calendar indicates these individuals or parameters at the mobile device). At 240, the policies that are determined at 230 are encoded into data packets and packaged in a distributable medium such as an XML file, for example. At 250, the encoded policies are loaded or downloaded to a mobile device and subsequently executed out of a local store or cache associated with the device.

As noted above, FIGS. 3-8 will now be described as specific examples to illustrate the general principals described above with respect to FIGS. 1 and 2. In this example, two Bayesian network models are constructed via supervised machine learning. One model predicts the interruptability of a user. More specifically, a model constructed that is used to infer a probability distribution over the cost of interruption of users. The second model outputs the probability that users will attend meetings that appear on their electronic calendar. Inferences from these models are then used to predict the expected cost of interruption at different times for a user. Additionally, it will be shown how to compute from output of the models, the value of information associated with asking users in real time about their situation. Such an analysis considers inferences from the models as well as the frequency and types of calls coming in over time, for example.

Predictive models can be provided relating to the cost of interruption from evidence associated with a user's context, including a stream of sensed data generated by a user's interaction with a desktop computer and properties of items on a user's electronic calendar, for example. Online calendars are central for coordinating meetings in many enterprises. For example, one popular (e.g., Outlook) calendaring subsystem can be employed for extending invitations to meetings, monitoring responses about planned attendance, and scheduling and tracking daily agendas.

To process such data, an appointment crawler and assessment tool can be constructed that searches through users' online calendars, as represented in a respective messaging and calendaring application. The appointment crawler sifts through online appointments and records sets of properties associated with each appointment. The appointment crawler notes, for each appointment, a set of properties drawn from the calendaring application, including the time of day and day of week of the meeting, meeting duration, subject, location, organizer, the response status of the user (e.g., responded yes, responded as tentative, did not respond, or no response request was made), whether the meeting is recurrent or not, whether the time is marked as busy or free on the user's calendar, whether the user was required or optional, the number of invitees, the organizational relationships of the invitees to the user, and the role of the user (e.g., user was the organizer versus a required or optional invitee). The system can then access an Active Directory service associated with the calendar to identify the organizer of the meeting and invitees and notes whether the organizer and attendees are organizational peers, direct reports, managers, or managers of the user's manager, and so forth.

The crawled data is used to build an assessment view that displays a form to users. The form includes a list of titles of meetings and provides fields for indicating the state of interruptability of users. FIG. 3 shows an example assessment palette 300 for assigning a cost of interruption to each crawled calendar item and a form used to define the meaning of high, medium, and low cost of interruption states. Users can employ this form to assign scalar values to each state of interruptability. For this assessment, users are asked to estimate the cost associated with a ringing phone during states of high, medium, and low cost of interruption. To ground the semantics of assessed cost throughout the system, the decision-analytic notion of willingness to pay is considered; wherein dollar values are sought that users would be willing to pay to avoid a call in each setting. Given the interruptability tags and appointment properties, a library of cases is constructed, and then a Bayesian structure search procedure is performed. This includes utilizing a greedy search across different structures to identify the probabilistic dependency structure that best explains the data, based on a score referred to as a Bayesian Information Criterion. The resulting Bayesian network can be used to infer probability distributions over the states of interruptability for previously unseen meetings, based upon a consideration of a set of observations and based at least in part on the properties of meetings.

Figure 4:
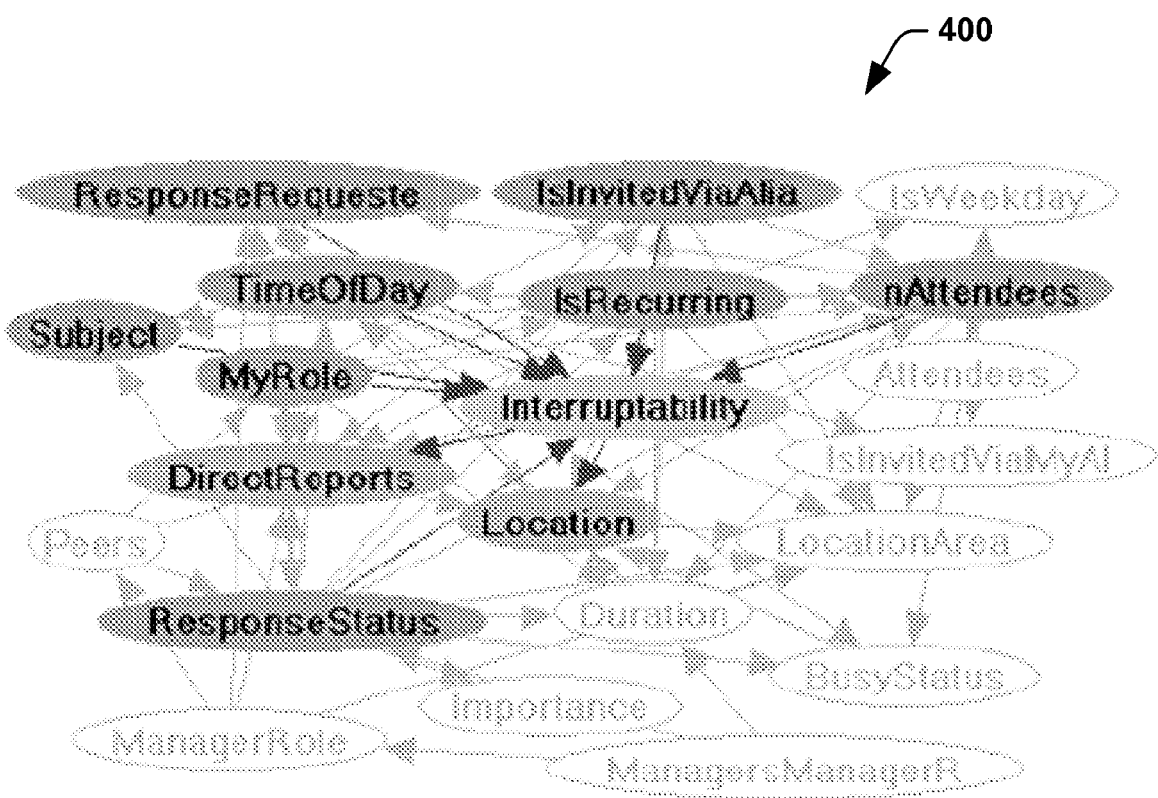
FIGS. 4 and 5 illustrate example Bayesian network models in accordance with an aspect of the subject invention.

FIG. 4 displays an example Bayesian network model 400 learned from a set of cases tagged by cost of interruption. The model 400 can be used to infer a probability distribution over states of interruptability, outputting for each previously unforeseen appointment the likelihood that the meeting has a high, medium, or low cost of interruption. A study of a model constructed from 559 appointments and tested on 100 hold out cases showed a classification accuracy of 0.81 for assigning interruptability.

Beyond models of the cost of interruption associated with a context associated with the attendance of a meeting, processes can also assess and learn in an analogous manner Bayesian network models that predict the likelihood that the meetings will be attended, based on meeting properties.

Figure 5:
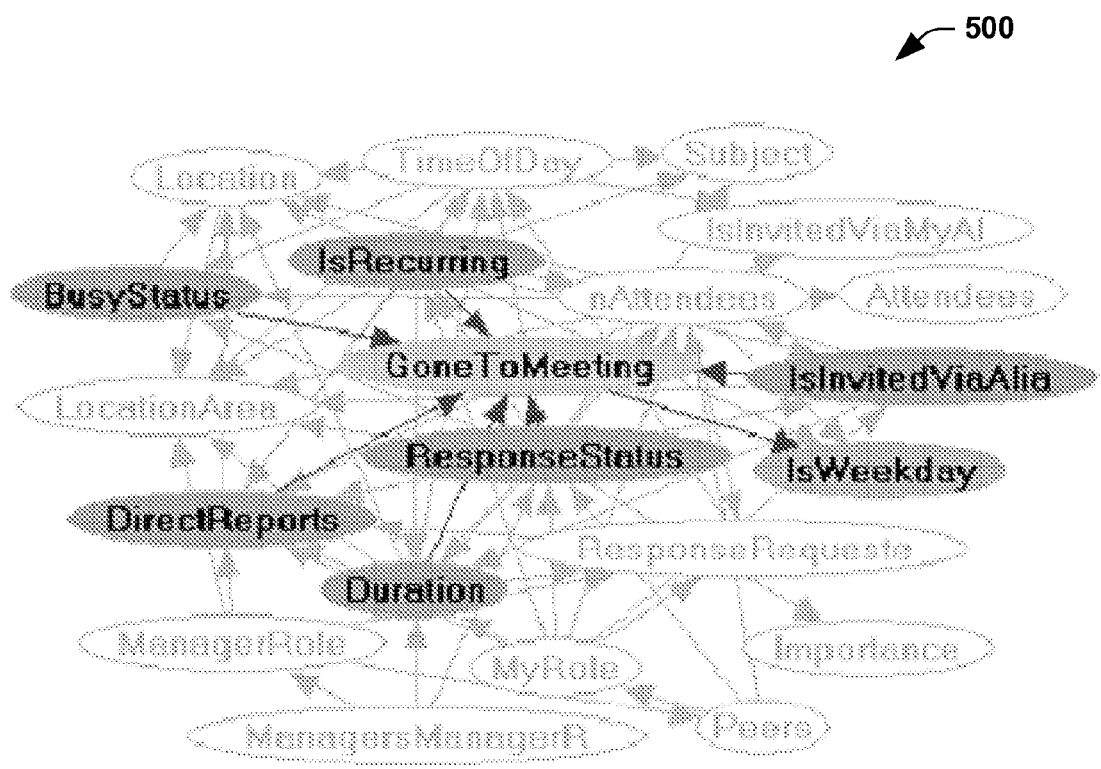

FIG. 5 shows a sample Bayesian network model 500 learned from training data for inferring the likelihood that a user would attend meetings, based on meeting properties. The model 500 was trained with the same appointments as were used to train the model for the cost of interruption described above. In use, the personalized attendance model generates, for previously unseen meetings, the likelihood that users will attend the meetings. For this model 500, a study of predictive accuracy on 100 cases held out for testing found that attendance was classified at an accuracy of 0.92.

The Bayesian networks 400 and 500 can be employed for predicting meeting attendance and the cost of interruption to compute the expected cost of interruption (ECI) associated with calls that ring through to users who are attending different types of meetings. To perform the computation of expected cost of interruption, the probability distribution over the cost associated with the meeting at hand is considered, as provided by the interruptability model 400, and the likelihood that a user will attend the meeting indicated on the user's calendar, as provided by the attendance model 500.

To compute the ECI of interrupting a user when a meeting on a user's calendar is recognized as being in progress, one additional type of information is typically considered—the default cost associated with receiving a phone call when a user does not attend a meeting indicated on a user's calendar. Such a default cost is typically a function of the time of day, as receiving a call during the early hours of the morning or very late at night and is likely to be different than receiving a call during business hours, and the cost of interruption may also be dependent on the day of week. To assess default costs of interruption, users are allowed to scan over default high, medium, and low cost regions within a seven day by twenty-four hour time palette, and to define default costs of interruption to each value.

Figure 6:
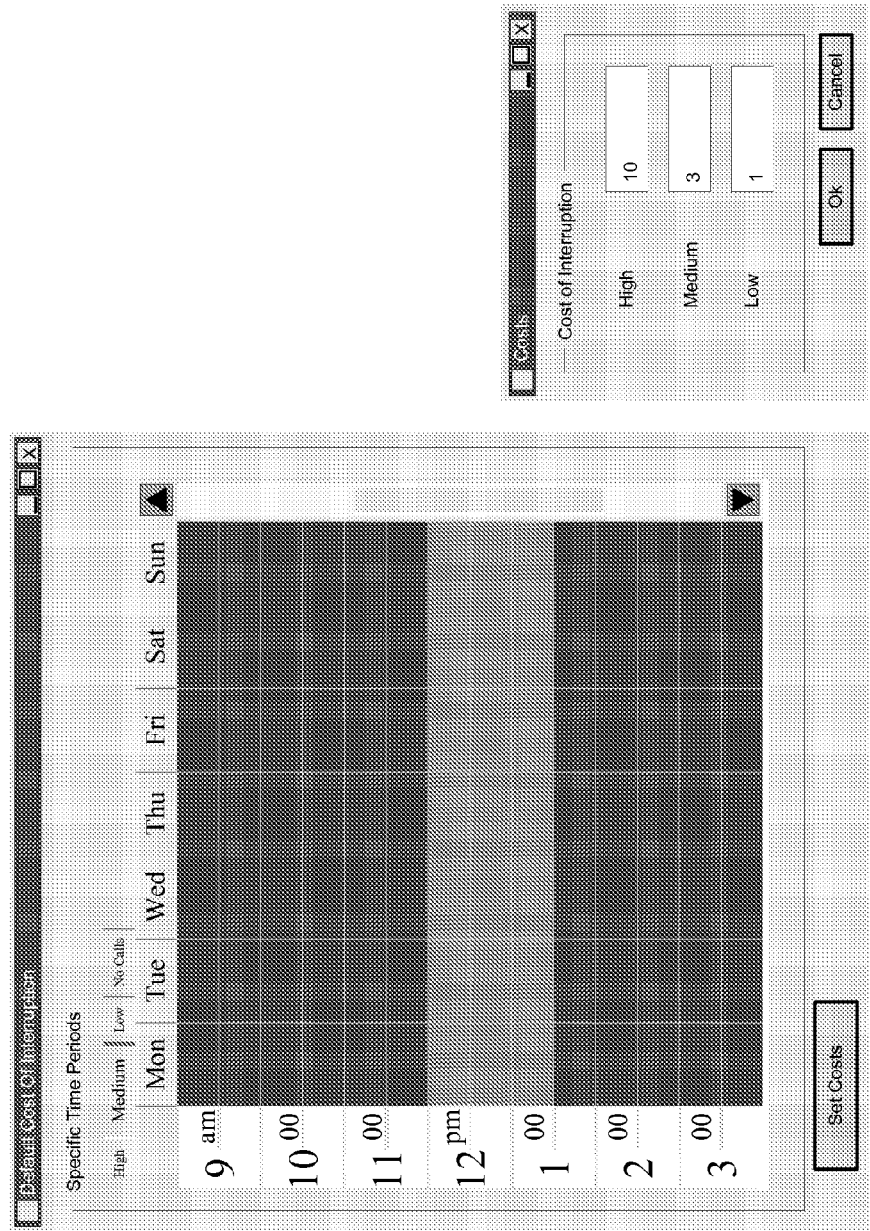
FIG. 6 illustrates an example tool for assessing costs of interruption in accordance with an aspect of the subject invention.

FIG. 6 displays a palette 600 for assessing the default of interruption by time. Given (1) an inferred distribution over the interruptability of a meeting, (2) the likelihood that a user will attend a meeting on their calendar, and (3) the default cost associated with the no-meeting situation, the ECI can be computed by weighting the cost of interruption for the no-attendance and attendance situations in accordance with the likelihoods of these states. Taking the expectation, the ECI is computed as, $$ECI = p(A \mid E)\sum_i p(c_i \mid E)c_i + (1 - p(A \mid E))c^b(S) \quad (1) \qquad \text{Equation 1}$$

where $p(A|E)$ is the likelihood that users will attend a meeting, given evidential properties E associated with the meeting, obtained via calendar appointment properties, $p(c_i|E)$ is the probability that users will assign a cost $c_i$ to the meeting, where i indexes the meeting as being either in low, medium, or high cost, and $cb(S)$ is the background cost of being interrupted in the default situation S, representing the case where a user does not attend a meeting, as captured by the time of day and day of week. The default cost can be extended to be dependent on multiple aspects of a user's overall context S. For example, with extensions to standard cell phones to allow local sensing, the model of default cost could be extended to consider such additional evidence as a user's location and motion.

Given a computation of the expected cost of interruption in terms of dollars, consider trading off this cost with the cost of deferring a conversation until later. A noted aspect of the decision is the cost of deferring calls from different callers. Thus, obtain from users the dollar-value cost associated with delayed communication when a call is routed to voicemail rather than a real-time conversation, for example. For such an assessment, allow users to define groups of callers, based on properties of people, so as to provide a manageable set of classes.

Figure 7:
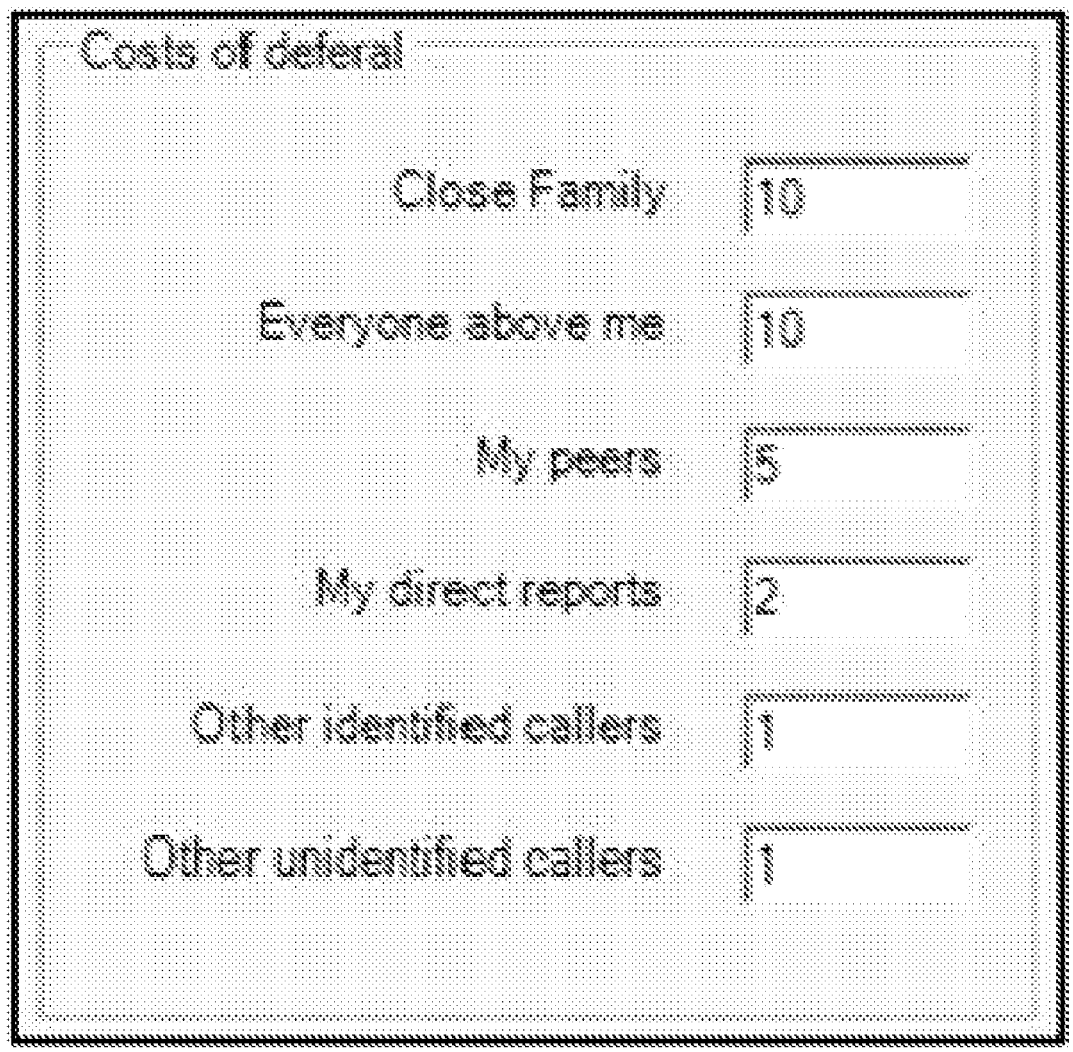
FIG. 7 illustrates an example tool for assigning costs of deferral in accordance with an aspect of the subject invention.

FIG. 7 illustrates an example cost of deferral assessment tool 700 that allows users to create groups of people based on sets of properties of people including organizational relationships and activities. The tool 700 allows users to create such organization-related groups as peers, direct reports, manager, position higher-up in the organizational chart, person within organization, and people identified in a user's list of contacts, for example. Users can also select activity-based groups, so as to have their device recognize people who are scheduled in meetings in the next hour, on the same day, or later in the same week, for example. Another activity-based group provided by the system is "people I have called today" and "people I have called this week." The tool 700 can also be used to build ad hoc groups like "critical associates," and "close friends," for example.

Equation 1 above is then employed to pre-compute the expected cost of interruption based on meeting properties for any time during the day. Such information in addition to the cost of deferral associated with different groups is then downloaded as compiled policy to a device (e.g., cell phone) and executed at the device for mediating incoming phone calls.

Figure 8:
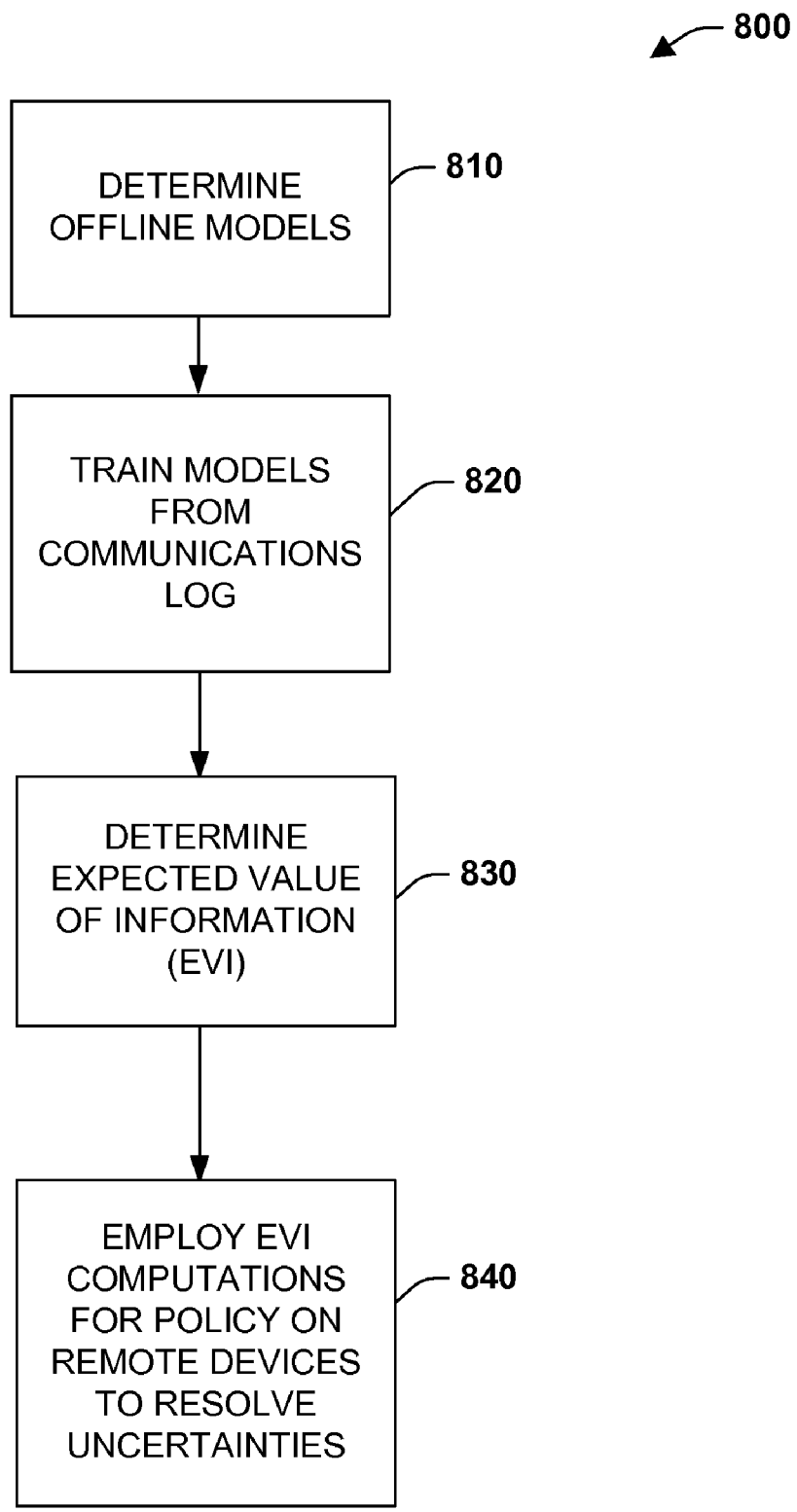
FIG. 8 is a flow diagram illustrating an automated dialog process for resolving uncertainty in accordance with an aspect of the subject invention.
Figure 9:
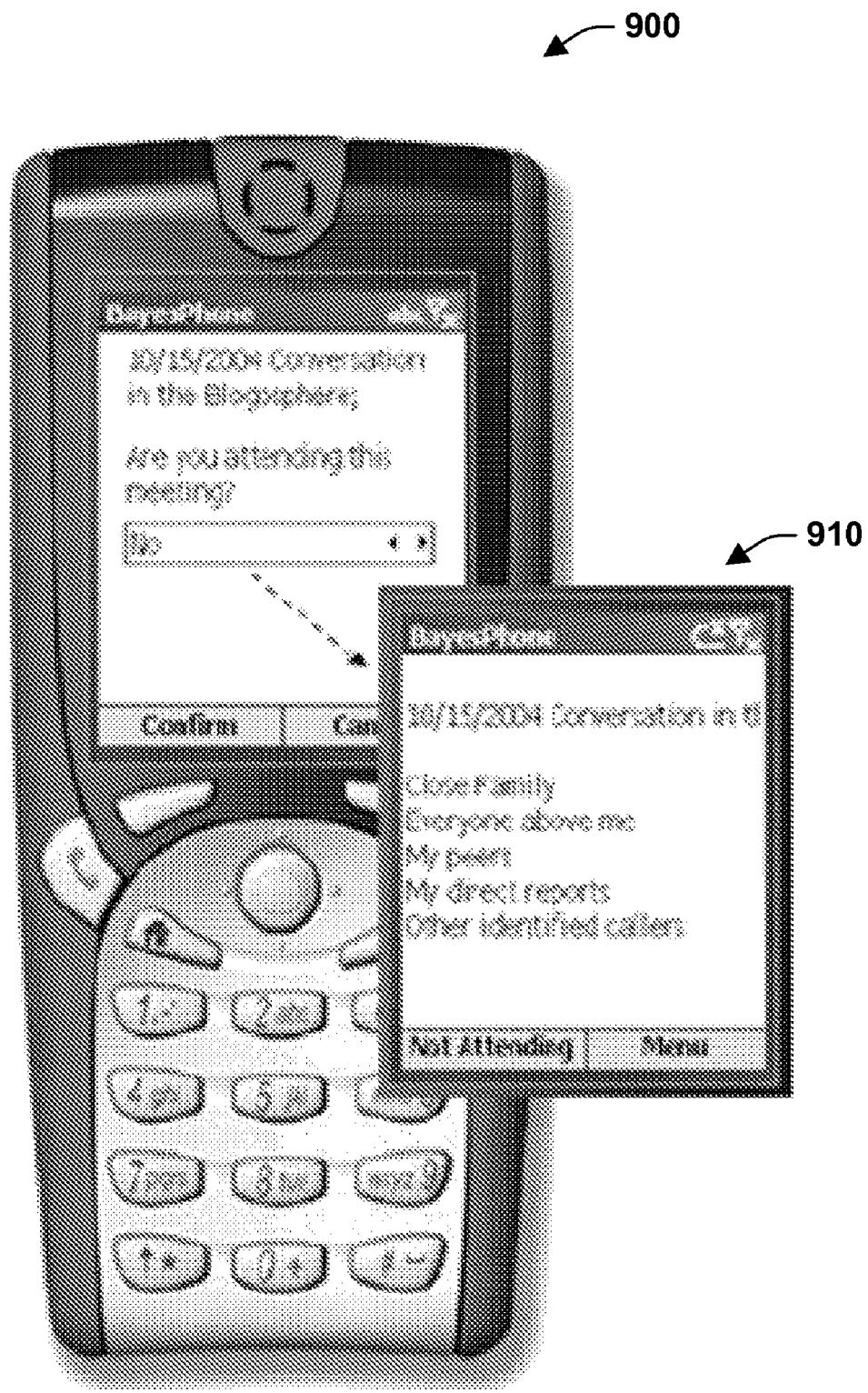
FIG. 9 illustrates an example mobile device to process policies in accordance with an aspect of the subject invention.

An example desktop and mobile device application is illustrated in FIG. 9, however, pre-computation of value of information for making decisions about when to acquire additional information (e.g., generate dialog) from users is now considered with respect to FIG. 8.

Before describing a specific application example, FIG. 8 is provided as a generalized process for determining whether or not to inquire for additional information from users to resolve decision-making uncertainty. At 810, one or more offline models can be defined. As will be described in more detail below, this can include determining such aspects as expected communications costs and expected costs of interruptions as described above with respect to Equation 1. At 820, model training can occur such as from a log or data store associated with incoming calls. At 830, an expected value of information (EVI) determination can be made (described in more detail below) to determine whether to engage the user for more information with the potential to resolve uncertainty from the decision process. At 840, the EVI determination is encoded as policy and downloaded to a mobile device to resolve future scenarios where further input can be queried from users to resolve potential uncertainty. The following now describes a specific application example of the generalized process 800 outlined in FIG. 8.

Beyond storing policies for making optimal decisions based on information that is currently available to a system as described above, a basic cost-benefit analysis model can be extended with pre-computation about whether it is worthwhile for a device (e.g., cell phone) to ask users at run time to assist with resolving uncertainties about the user's situation. More specifically, the value of asking users for information about whether they are attending a meeting that appears on their calendars can be pre-computed and resolved to basic policies as described above. Answers to such queries can resolve uncertainties used in the ECI computation of Equation 1, potentially increasing the value of call handling policies.

To identify optimal queries, compute the expected value of information (EVI) of asking users for information. This computation, EVI is a decision-theoretic measure of the value of gathering additional information that considers the current uncertainties, the likelihood of different answers to a query for more information, and the ultimate influence of different answers on policies. For the case of phone example described in FIG. 9 below, pre-compute the value of asking a user if they intend to attend a meeting before a meeting is scheduled to begin. The question itself incurs a cost of interruption that should be balanced with the gains in value based in the new information.

To compute the value of asking the user about attendance, consider the ECI of Equation 1 before and after asking, and the cost of querying the user. Given an answer, the ECI should be either be the expected cost associated with the meeting (the first term in Equation 1), or the background cost of the time of day (the second term Equation 1).

To compute the value of information, a new value is introduced, capturing the overall communication cost associated with a period of time. This value is an expected communication cost (ECC) for a period of time which is the cost of deferral and cost of interruption for incoming calls during the period. It is generally desired to interact with a user only if the reduction in ECC is greater than the cost of asking. The example phone in FIG. 9 pre-computes the value of information for the meetings and uses this information to drive selective question querying.

The current ECC is computed by maintaining a log of incoming calls. During a training period, the phone records a log of incoming calls by group. This log is segmented into calls that arrive at different time periods. For one example implementation, consider eight periods: mornings, afternoons, evenings, and late night for weekdays and weekends, for example. For each period, compute the rates at which calls associated with different caller groups arrive each hour. Given this information, compute the ECC for any value of the cost of interruption. Then, note or tag the expected number of calls that will be deferred and the calls that will ring through to a user given the computed ECI. The expected numbers of each class of calls are computed as a product of the stored rates for each caller group and the duration of the period. The ECC for a meeting of duration t based on a consideration of current evidence E with respect to properties of the upcoming meeting is, $$ECC(E, t) = \left(\sum_i f_i c_i^{defer} + \sum_j f_j c_j^{ring}\right) t \quad \text{Equation 2}$$

where fi is frequency of calls in each caller group i that has a cost of deferral lower than the cost of interruption, fj is the frequency of calls in each caller group j that has a cost of deferral higher than the cost of interruption, and cdefer and cring are the costs of deferral and cost of interruption of each of these caller classes, respectively.

Note that cring is merely the current expected cost of interruption, ECI, as computed with Equation 1, thus Equation 2 can be re-written as, $$ECC(E, t) = \left(\sum_i f_i c_i^{defer} + \sum_j f_j ECI(E)\right) t \quad \text{Equation 3}$$

To compute the EVI of asking the user a question, re-compute ECI and ECC separately for the answers of "attending" and "not attending," identifying the changes in the numbers of calls in the deferral and the ring-through classes for the updated values of ECI, and combine these two ECC values together, weighted by the probability of hearing each answer. The communication cost for the answer, "attending meeting" considers the expected cost associated with being at the meeting as, $$ECC(E, a, t) = \left(\sum_i f_i' c_i^{defer} + \sum_j f_j' \sum_k p(c_k \mid E) c_k\right) t \quad \text{Equation 4}$$

The communication cost for the answer, "not attending" takes as the cost of interruption, the background cost associated with the time of day as, $$ECC(E, \bar{a}, t) = \left(\sum_i f_i'' c_i^{defer} + \sum_j f_j'' c^b\right) t \quad \text{Equation 5}$$

Putting these terms together, compute the expected value of asking the user as, $$EVI(E, t) = ECC(E, t)[-p(A \mid E)ECC(E, a, t) + \quad \text{Equation 6}$$
$$(1 - p(A \mid E))ECC(E, \bar{a}, t)] - C^a$$

where Ca is the cost of asking the user before the meeting, the ECI before the meeting begins. The system also considers the added value of directly asking a user about the interruptability of a meeting, given that the user has answered that the meeting will be attended, using an analogous value of information computation. Users are asked to additionally, and optionally, answer a second question about the cost of interruption if acquiring that information is worth the incremental cost of asking the second question.

FIG. 9 illustrates an example mobile device 900 for executing policies in accordance with an aspect of the subject invention. The device or phone 900 can include two applications: (1) a desktop application, running on a conventional operating system that performs inference, cost-benefit analyses, and value of information pre-computation of optimal real-time actions and interactions, and (2) an application running on the device 900 that downloads a pre-computed policy file when the device is docked with the desktop via a synchronization program. The desktop application analyzes each forthcoming meeting, making inferences with Bayesian network models for both attendance and interruptability. A client application considers these inferences along with the costs of deferral of calls from callers in different groups, the expected cost of interruption with taking calls for each meeting, and the history of incoming calls in the user's call log, and pre-computes the ideal call-handling actions and interactions for each meeting. The desktop system creates an XML-encoded file, which includes for each meeting, the meeting title, date, and time, whether the user should be asked with an alert about meeting attendance before the meeting, and the list of caller groups who are allowed to breakthrough to the user during the meeting for the no-interaction or no-answer case, and for each answer.

In use, a user may be asked before a meeting occurs about whether they plan to attend a forthcoming meeting. A special alert tone is used to inform the user about the question, and a screen appears at 910 that allow the user to specify whether they will attend the meeting. The maximum likelihood answer is displayed on the device, allowing the user to either confirm or to change the guess. If no answer is available with three minutes (or other predetermined timeframe), the question times out and the title of the meeting appears on the screen, along with the groups who can breakthrough. Users can directly change their attendance status or the cost of interruption at any time via a menu, and the pre-computed policy for the state will be accessed and displayed.

The device 900 displays two screens of an application executing example call-handling policies although other screens can be provided. In this case, the system has alerted the user to the value of answering a question about attendance before a meeting. The system has guessed that the user will not attend the meeting, and the user confirms this guess. After the interaction, the system shows the user the caller groups that will be allowed to breakthrough. At run time, the device 900 intercepts incoming calls and takes control of the ringing of the phone. The application checks caller identification, examines the list of callers allowed via the pre-computed cost-benefit analysis, and decides whether to ring the phone versus transfer the call to voicemail. As can be appreciated, various policies can be pre-computed and downloaded to devices for various applications in accordance with the subject invention.

Figure 10:
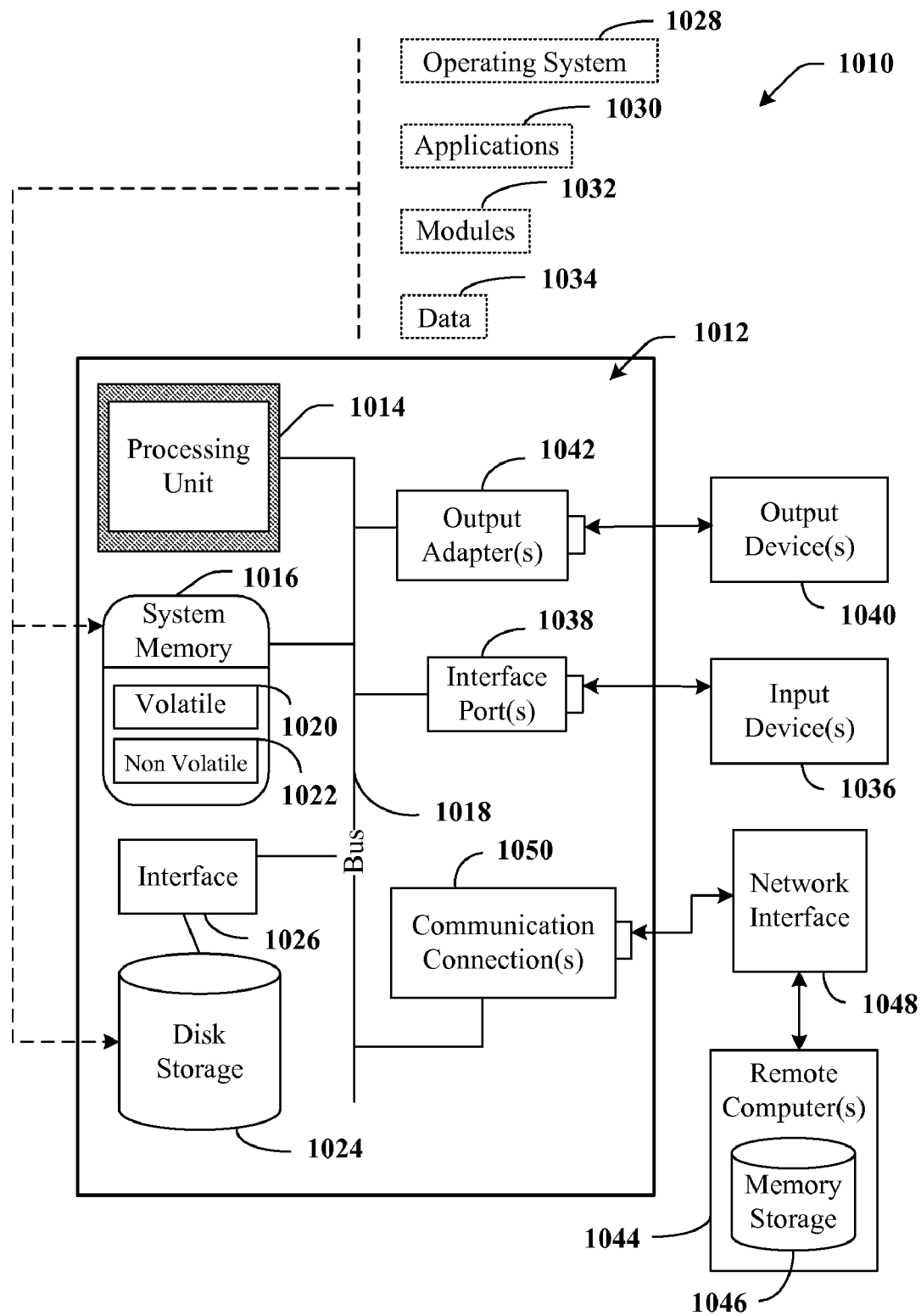
FIG. 10 is a schematic block diagram illustrating a suitable operating environment in accordance with an aspect of the subject invention.

With reference to FIG. 10, an exemplary environment 1010 for implementing various aspects of the invention includes a computer 1012. The computer 1012 includes a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multi-processor architectures also can be employed as the processing unit 1014.

The system bus 1018 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 1016 includes volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can include read only memory (ROM), programmable ROM (PROM), electrically programmable ROM (EPROM), electrically erasable ROM (EEPROM), or flash memory. Volatile memory 1020 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1012 also includes removable/non-removable, volatile/non-volatile computer storage media. FIG. 10 illustrates, for example a disk storage 1024. Disk storage 1024 includes, but is not limited to, devices like a magnetic disk drive, floppy disk drive, tape drive, Jaz drive, Zip drive, LS-100 drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to the system bus 1018, a removable or non-removable interface is typically used such as interface 1026.

It is to be appreciated that FIG. 10 describes software that acts as an intermediary between users and the basic computer resources described in suitable operating environment 1010. Such software includes an operating system 1028. Operating system 1028, which can be stored on disk storage 1024, acts to control and allocate resources of the computer system 1012. System applications 1030 take advantage of the management of resources by operating system 1028 through program modules 1032 and program data 1034 stored either in system memory 1016 or on disk storage 1024. It is to be appreciated that the subject invention can be implemented with various operating systems or combinations of operating systems.

A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port may be used to provide input to computer 1012, and to output information from computer 1012 to an output device 1040. Output adapter 1042 is provided to illustrate that there are some output devices 1040 like monitors, speakers, and printers, among other output devices 1040, that require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a personal computer, a server, a router, a network PC, a workstation, a microprocessor based appliance, a peer device or other common network node and the like, and typically includes many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1050 refers to the hardware/software employed to connect the network interface 1048 to the bus 1018. While communication connection 1050 is shown for illustrative clarity inside computer 1012, it can also be external to computer 1012. The hardware/software necessary for connection to the network interface 1048 includes, for exemplary purposes only, internal and external technologies such as, modems including regular telephone grade modems, cable modems and DSL modems, ISDN adapters, and Ethernet cards.

Figure 11:
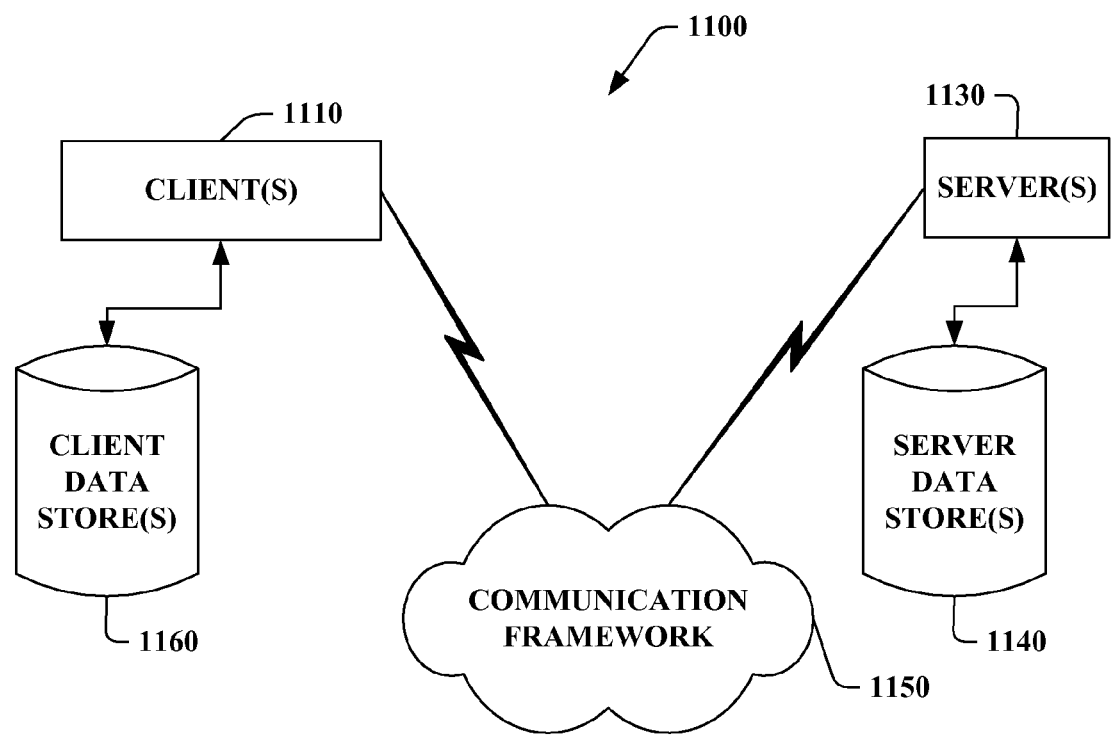
FIG. 11 is a schematic block diagram of a sample-computing environment with which the subject invention can interact.

FIG. 11 is a schematic block diagram of a sample-computing environment 1100 with which the subject invention can interact. The system 1100 includes one or more client(s) 1110. The client(s) 1110 can be hardware and/or software (e.g., threads, processes, computing devices). The system 1100 also includes one or more server(s) 1130. The server(s) 1130 can also be hardware and/or software (e.g., threads, processes, computing devices). The servers 1130 can house threads to perform transformations by employing the subject invention, for example. One possible communication between a client 1110 and a server 1130 may be in the form of a data packet adapted to be transmitted between two or more computer processes. The system 1100 includes a communication framework 1150 that can be employed to facilitate communications between the client(s) 1110 and the server(s) 1130. The client(s) 1110 are operably connected to one or more client data store(s) 1160 that can be employed to store information local to the client(s) 1110. Similarly, the server(s) 1130 are operably connected to one or more server data store(s) 1140 that can be employed to store information local to the servers 1130.

What has been described above includes examples of the subject invention. It is, of course, not possible to describe every conceivable combination of components or methodologies for purposes of describing the subject invention, but one of ordinary skill in the art may recognize that many further combinations and permutations of the subject invention are possible. Accordingly, the subject invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method to facilitate mobile device operations, comprising:
   employing a processor to execute computer executable instructions stored on a computer readable storage medium to implement the following acts:
   utilizing each of a training input and a user input to develop logical rules or probabilistic user models in an offline computing environment, the probabilistic user models are associated with a model of interruptibility or a model of attendance;
   generating a policy component that includes decision-making instructions derived from at least one of the logical rules or probabilistic user models developed in the offline computing environment; and
   transmitting the policy component to a mobile device.

2. The method of claim 1, further comprising providing policies associated with the policy component to facilitate making decisions about call handling, including one or more of: whether to send a call silently to a voicemail system: ring or vibrate with a particular chime and intensity: display information visually: play a particular outgoing message: let a caller know when a user will next be available; allow the caller to indicate a desire to ring through to the user after hearing an outgoing message describing aspects of the user's current context: or allow the caller to reschedule the call to another available time.

3. The method of claim 1, further comprising providing policies that allow for sensing of local state or state changes with one or more of a microphone, photocell, camera, accelerometer, thermometer, barometer, GPS device, or wireless radio signals, where the wireless signals include GSM strengths, which are embedded in a device or connected to a device via wire or wireless connection.

4. The method of claim 1, further comprising using at least one user interface to train the associated probabilistic user models.

5. The method of claim 1, further comprising communicating via a client component on the device to interact with a desktop computing application.

6. A computer implemented method for developing model policies system, comprising:
   employing a processor to execute computer executable instructions stored on a computer readable storage medium to implement the following acts:
   recording a set of appointment properties associated with a user's electronic calendar;

utilizing the set of appointment properties associated with the user's electronic calendar to develop logical rules or probabilistic user models in an offline computing environment;

developing a policy component that includes decision-making instructions that are derived from the logical rules or probabilistic user models; and encoding the policy component for implementation onto a mobile device.

7. The method of claim 6, further comprising recording a set of appointment properties by crawling a user's online calendar.

8. The method of claim 6, further comprising recording for each appointment, one or more of: time of day of the appointment, day of week of the appointment, appointment duration, subject of the appointment, location of the appointment, organizer of the appointment, the response status of the user, whether the appointment is recurrent or not, whether the time is marked as busy or free on the user's calendar, whether the user was required or optional, the number of invitees, the organizational relationships of the invitees to the user, and the role of the user.

9. The method of claim 6, wherein the probabilistic user models are associated with a model of interruptibility or a model of attendance.

10. The method of claim 6, further comprising using at least one user interface to train the models associated with the probabilistic user models.

11. The method of claim 6, further comprising training the probabilistic user models from explicit or implicit user input.

12. The method of claim 6, further comprising implementing at least one Bayesian network model or graphical model with the probabilistic user models.

13. The method of claim 6, further comprising executing a cost/benefit analysis associated with the probabilistic user models, where policies are created in accordance with a goal of maximizing expected value or minimizing an expected cost based upon a consideration of a likelihood of different future situations.

14. The method of claim 6, further comprising determining an expected cost of interruption (ECI) computation associated with the probabilistic user models.

15. The method of claim 14, further comprising determining the ECI computation using the following equation:

$$ECI = p(A \mid E) \sum_i p(c_i \mid E) c_i + (1 - p(A \mid E)) c^b(S);$$

where $p(A|E)$ is a likelihood that users will attend a meeting, given evidential properties E associated with the meeting obtained via calendar appointment properties, $p(c_i|E)$ is a probability that users assign a cost $c_i$ to the meeting, where i indexes the meeting as being low, medium, or high cost, and $c^b(S)$ is a background cost of being interrupted in a context S, representing where a user does not attend a meeting, as captured by a time of day and day of week.

16. The method of claim 14, further comprising determining a default ECI value when a user is not attending an appointment.

17. The method of claim 6, further comprising determining an expected cost of deferral associated with the probabilistic user models based, at least in part on, organizational relationships and activities.

18. The method of claim 6, further comprising determining at least one of an expected cost of communications (ECC) and an expected value of information (EVI) to determine at least one dialog query.

19. The method of claim 18, further comprising executing the following equation where the ECC for a meeting of duration t based on a consideration of current evidence E with respect to properties of an upcoming meeting is, $$ECC(E, t) = \left( \sum_i f_i c_i^{defer} + \sum_j f_j c_j^{ring} \right) t$$

and where $f_i$ is a frequency of calls in each caller group i that has a cost of deferral lower than a cost of interruption, $f_j$ is a frequency of calls in each caller group j that has a cost of deferral higher than the cost of interruption, and $c^{defer}$ and $c^{ring}$ are the costs of deferral and cost of interruption of respective caller classes.

20. A system to facilitate mobile device operations, comprising:

a processor;

a memory communicatively coupled to the processor and storing computer readable instructions for implementing the following components;

a learning component for learning user models in an offline computing environment, the user models learned by utilizing each of a training input and a user input in the offline computing environment, the user models are associated with a model of interruptibility or a model of attendance;

an encoding component for encoding an output from the user model according to one or more control policies; and a transmission component for transmitting the control policies to a remote device, the control policies executable in an online computing environment at the remote device apart from the offline computing environment.

* * * * *